United States Patent
Koeneman et al.

(10) Patent No.: US 9,816,190 B2
(45) Date of Patent: Nov. 14, 2017

(54) ENERGY EXTRACTION SYSTEM AND METHODS

(71) Applicants: Robert Louis Koeneman, Cape Canaveral, FL (US); Traver Hall Kennedy, Cape Canaveral, FL (US)

(72) Inventors: Robert Louis Koeneman, Cape Canaveral, FL (US); Traver Hall Kennedy, Cape Canaveral, FL (US)

(73) Assignee: Joi Scientific, Inc., Merritt Island, FL (US)

(*) Notice: Subject to any disclaimer, the term of this patent is extended or adjusted under 35 U.S.C. 154(b) by 0 days.

(21) Appl. No.: 14/616,851

(22) Filed: Feb. 9, 2015

(65) Prior Publication Data

US 2017/0088958 A1    Mar. 30, 2017

Related U.S. Application Data

(60) Provisional application No. 62/091,702, filed on Dec. 15, 2014.

(51) Int. Cl.
  *C25B 15/02* (2006.01)
  *C25B 1/04* (2006.01)
  (Continued)

(52) U.S. Cl.
  CPC ............. *C25B 1/04* (2013.01); *C25B 9/04* (2013.01); *C25B 9/06* (2013.01); *C25B 9/18* (2013.01);
  (Continued)

(58) Field of Classification Search
  CPC .............. C25B 1/04; C25B 9/06; C25B 15/02
  See application file for complete search history.

(56) References Cited

U.S. PATENT DOCUMENTS

| 4,424,105 A | 1/1984 | Hanson |
| 4,795,537 A | 1/1989 | Timewell |

(Continued)

FOREIGN PATENT DOCUMENTS

| CN | 202011906 U | 10/2011 |
| CN | 104073838 A | 10/2014 |

(Continued)

OTHER PUBLICATIONS

International Search Report (ISR)—PCT/US2015/065854—Mar. 10, 2016—6 pages (including notification of transmittal of the ISR and WO of the ISA).

(Continued)

*Primary Examiner* — Nicholas A Smith
(74) *Attorney, Agent, or Firm* — Krishna Kalidindi

(57) ABSTRACT

A system for extracting hydrogen from seawater includes a hollow chamber defined by a cylindrical wall, a cylindrical member within the chamber, a mechanism for recirculating conductive fluid through the chamber, a power supply connected via reactive circuits to the chamber wall to form an anode and to the cylindrical member to form a cathode and providing an input pulse DC voltage during a duty cycle on portion and an off cycle chamber return load circuit connected to the reactive circuits, and an off cycle chamber return load circuit connected to the positive and negative reactive circuits wherein the reactive circuits and the off cycle chamber return load circuit: process voltages returning from the chamber during an off portion of the duty cycle, the returning voltages resulting from an electro-chemical reaction in the chamber without surface reaction on the cylindrical member, and return the processed voltage to the chamber, wherein the chamber releases hydrogen gas.

19 Claims, 6 Drawing Sheets

(51) Int. Cl.
  *C25B 9/06* (2006.01)
  *C25B 11/02* (2006.01)
  *C25B 15/08* (2006.01)
  *C25B 9/04* (2006.01)
  *C25B 9/18* (2006.01)
  *C25B 11/12* (2006.01)

(52) U.S. Cl.
  CPC .............. *C25B 11/02* (2013.01); *C25B 11/12* (2013.01); *C25B 15/02* (2013.01); *C25B 15/08* (2013.01); *Y02E 60/366* (2013.01)

(56) References Cited

U.S. PATENT DOCUMENTS

| | | | |
|---|---|---|---|
| 4,936,961 A | 6/1990 | Meyer | |
| 5,037,518 A | 8/1991 | Young et al. | |
| 6,332,434 B1 | 12/2001 | DeSouza | |
| 6,790,324 B2 | 9/2004 | Chambers | |
| 7,240,641 B2 | 7/2007 | Balan et al. | |
| 7,452,449 B2 | 11/2008 | Weinberg et al. | |
| 7,604,728 B2 | 10/2009 | Schlager | |
| 7,615,138 B2 | 11/2009 | Davidson | |
| 8,709,221 B1* | 4/2014 | Smith | C25B 15/02 204/230.2 |
| 8,940,151 B1 | 1/2015 | Hartvigsen et al. | |
| 8,940,243 B1 | 1/2015 | Fahimi | |
| 9,034,167 B2 | 5/2015 | Finfrock et al. | |
| 9,340,885 B1 | 5/2016 | Koeneman | |
| 9,347,142 B1 | 5/2016 | Koeneman | |
| 9,353,451 B2 | 5/2016 | Haywood | |
| 2006/0060464 A1 | 3/2006 | Chang | |
| 2007/0080071 A1 | 4/2007 | Perry, Jr. | |
| 2007/0216165 A1 | 9/2007 | Oohara | |
| 2007/0272546 A1* | 11/2007 | Matthews | C25B 15/02 204/230.2 |
| 2008/0277273 A1 | 11/2008 | Logan | |
| 2008/0302670 A1 | 12/2008 | Boyle | |
| 2009/0045073 A1 | 2/2009 | Stone et al. | |
| 2009/0266706 A1 | 10/2009 | Fukui et al. | |
| 2009/0283402 A1 | 11/2009 | Osman | |
| 2010/0089746 A1 | 4/2010 | Chang | |
| 2010/0175941 A1 | 7/2010 | Khodabaksh | |
| 2010/0183931 A1 | 7/2010 | Hedman | |
| 2011/0146599 A1 | 6/2011 | Sciban et al. | |
| 2011/0259757 A1 | 10/2011 | Vancina | |
| 2012/0012456 A1 | 1/2012 | Darrel | |
| 2012/0058405 A1 | 3/2012 | Kirchoff | |
| 2012/0104766 A1 | 5/2012 | Davidson | |
| 2012/0111734 A1 | 5/2012 | Kramer | |
| 2012/0152197 A1 | 6/2012 | Inskeep | |
| 2012/0175247 A1 | 7/2012 | Darrel | |
| 2012/0199472 A1 | 8/2012 | Curfew | |
| 2012/0222954 A1 | 9/2012 | Lothring | |
| 2013/0118908 A1 | 5/2013 | Radu | |
| 2014/0048067 A1 | 2/2014 | McGill | |
| 2014/0363806 A1 | 12/2014 | Fillipone | |
| 2014/0367272 A1* | 12/2014 | Haywood | C25B 15/08 205/341 |
| 2016/0068976 A1 | 3/2016 | Yoshida et al. | |
| 2016/0168727 A1 | 6/2016 | Koeneman | |
| 2016/0168731 A1 | 6/2016 | Koeneman | |
| 2016/0168736 A1 | 6/2016 | Koeneman | |
| 2017/0044677 A1 | 2/2017 | Kurokawa et al. | |

FOREIGN PATENT DOCUMENTS

| | | |
|---|---|---|
| DE | 2713533 | 9/1978 |
| EP | 0 975 822 B1 | 2/2004 |
| JP | 2006257480 A2 | 3/2005 |
| JP | 2006037214 A2 | 2/2006 |
| JP | 2013231213 A | 11/2013 |
| WO | 2004097072 A1 | 11/2004 |
| WO | 2007131254 A2 | 11/2007 |
| WO | 2010024965 A1 | 3/2010 |
| WO | 2010084358 A2 | 7/2010 |
| WO | 2011139893 A1 | 11/2011 |
| WO | 2013031522 A1 | 3/2013 |
| WO | 2014028951 A1 | 2/2014 |
| WO | 2014064470 A1 | 5/2014 |
| WO | 2015098058 A1 | 7/2015 |
| WO | 2015137889 A1 | 9/2015 |
| WO | 2016054371 A1 | 4/2016 |
| WO | 2016068842 A1 | 5/2016 |
| WO | 2017004732 A1 | 1/2017 |

OTHER PUBLICATIONS

Written Opinion (WO) of International Search Authority (ISA)—PCT/US2015/065854—Mar. 10, 2016—7 pages.
International Search Report (ISR)—PCT/US2015/065785—Mar. 4, 2016—6 pages (including notification of transmittal of the ISR and WO of the ISA).
Written Opinion (WO) of International Search Authority (ISA)—PCT/US2015/065785—Mar. 4, 2016—8 pages.
http://web.archive.org/web/20130130100756/https://en.wikipedia.org/wiki/Band-stop_filter—Jan. 20, 2013.
"Water Eletrolysis with Voltage Inductive Pulses", Vanags, Martins et al., Electrolysis, Chapter 2, 2012.
"Pulsed DC And Anode Depolarization In Water Electrolysis For Hydrogen Generation", Shaaban, Aly H., Aug. 1994.
"Economical Hydrogen Production By Electrolysis Using Nano Pulsed DC", Dharmaraj, C. H. and AdishKumar, S.; International Journal Of Energy And Environment, vol. 3, Issue 1, pp. 129-136, 2012.
"Review Of Pulsed Power For Efficient Hydrogen Production", Monk, N. and Watson, S. J.; International Journal Of Hydrogen Energy, 41 (19), pp. 7782-7791, 2016.
"Effects Of Geometry Of Electrodes And Pulsating DC Input On Water Splitting For Production Of Hydrogen", Mandal, Biswajit, Sirkar, A., Shau, Abhra, De, P. and Ray, P.; International Journal Of Renewable Energy Research, vol. 2, No. 1, 2012.
"Influence Of Electrical Conductivity And pH On Hydrogen Production Using Pulsed Discharge Over The Water Surface", Ihara, Takeshi, Ide, Yusuke, Nagata, Hideo, Yagyu, Yoshihito, Ohshima, Tamiko, Kawasaki, Hiroharu, Suda, Yoshiaki; Plasma Science (ICOPS), 2016—Abstract.
"DC Electrical Breakdown Of Water In A Sub-Micron Planar Gap", Song, Chunrong and Wang, Pingshan; IEEE 2009.

* cited by examiner

ENERGY EXTRACTION SYSTEM AND METHODS

BACKGROUND

The present disclosure relates generally to harnessing energy and more particularly to improved methods, apparatus, and arrangements for extracting hydrogen, and optionally carbon dioxide, from a feedstock such as seawater.

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

There is a compelling need for an environmentally responsible, economically efficient point-of-use generation system designed for producing hydrogen gas, without oxygen, for industrial, commercial and residential uses including uses as a fuel source or as a source for commercial or industrial grade hydrogen. There are many well-documented problems associated with over-reliance upon energy generated from fossil fuels. For example, pollution and climate change caused by the emission of greenhouse gases, finite and dwindling reserves of carbon-based energy sources, and concentration of petroleum-based supply in OPEC and other volatile countries are all well documented. There is an urgent need for alternative energy sources that can avoid the above-mentioned problems.

In addition to its use as a fuel, hydrogen has many industrial and commercial applications. At 99.9% purity for example, hydrogen can be used in electric power utility generator cooling, steel production, float glass plants, electronics such as semiconductor, photovoltaic cells, optics, hydrogenation of fats and oils, commercial, industrial and education laboratories, materials processing including heat treating, bright annealing, brazing, powder metallurgy, glass-to-metal sealing, and high performance coatings and meteorological uses such as the replacement for helium in lighter-than-air devices.

At less than 99%-pure form, it can be used in aerospace, animal feed, automotive, chemicals, ethanol, food processing including bakeries, beverage bottling, chip manufacturing of chips and snack foods, dairy and meat processing, general manufacturing, hospitals and medical centers, hotels, laundry and uniform services, marine and offshore, military installations, mining, oil and gas, paper/corrugating, pharmaceuticals, resorts and recreational facilities, rubber, steel and metals, tobacco, transportation, wire and cable, and universities, colleges, and community colleges.

There are a number of significant hurdles that prevent the widespread use of hydrogen in commercial, industrial, and residential applications. These hurdles include cost, efficiency, and safety. First and foremost, creating hydrogen gas in traditional manner is inefficient and costly, or even environmentally harmful when produced via reformation of natural gas—the primary commercial method. Secondly, hydrogen's very low mass and energy density makes it challenging to get enough mass of hydrogen gas safely in one place to be of practical value to a user. The result is that hydrogen has been prohibitively expensive to produce, compress, cryogenically cool, maintain (at pressure and temperature), contain (due to its very small diatomic molecule), and transport. Pressure, temperature, flammability, explosiveness, and low ignition energy requirement are all significant safety issues.

Nonetheless, if a method of producing and applying hydrogen were to address these issues, it would be a boon to world markets and humanity's quality of life. Thus, for at least the reasons explained above, there exists an increasingly urgent and compelling need for the safe and efficient production and use of hydrogen.

Hydrogen is typically generated from water or from natural gas, coal or oil reformation. The separation of hydrogen and oxygen in water presents efficiency and safety barriers. Water is composed of two parts hydrogen and one part oxygen by mass or volume. Decomposed by any means, two moles of water will produce one mole of molecular or diatomic oxygen gas ($O_2$) and two moles of molecular or diatomic hydrogen gas ($H_2$) at a given input of energy $E_1$. When combined together through any means, hydrogen and oxygen react to form water, releasing a given output of energy $E_2$. By all known principles of physics and chemistry, $E_1 > E_2$ and thus by thermodynamics, the process is not favored in direct action. Thus, production of hydrogen in an ideally useable form from water presents a number of challenges.

Some efforts have involved the dissociation of water through various techniques and arrangements to produce a "brown gas". Brown gas is a gas obtained by electrolysis of water and is a mixed gas of hydrogen and oxygen in the ratio of 2:1. The combined presence of hydrogen and oxygen makes brown gas extremely volatile and explosive. Upon combustion, brown gas also burns at an exceedingly high temperature. Thus, for at least the reasons stated above, the use of brown gas as a fuel source is problematic. Technologies that produce brown gas are not suitable for safe, large scale hydrogen production.

While certain aspects of conventional technologies have been discussed to facilitate a description of exemplary embodiments, Applicants in no way disclaim these technical aspects, and it is contemplated that exemplary embodiments may encompass or include one or more of the conventional technical aspects discussed herein.

SUMMARY

Exemplary embodiments address one or more of the problems and deficiencies of the prior art discussed above. However, other problems and deficiencies may also be addressed, and other benefits and advantages may be realized in a number of technical areas. Therefore exemplary embodiments should not necessarily be construed as being limited to addressing any of the particular problems or deficiencies discussed herein.

According to an exemplary embodiment, a system for extracting hydrogen from a conductive fluid comprises: a hollow chamber defined by a cylindrical wall; a cylindrical member disposed within the chamber parallel to the wall; a mechanism for providing conductive feedstock to the chamber; a second mechanism for re-circulating the conductive feedstock through the chamber; a power supply having a positive terminal connected via a positive reactive circuit to the chamber wall to form an anode and a negative terminal connected via a negative reactive circuit to the cylindrical member to form a cathode, the power supply providing an input pulse DC voltage for an on portion of a duty cycle; and an off-cycle chamber return load circuit connected to the positive and negative reactive circuits wherein the reactive circuits and the off cycle chamber return load circuit process:

voltages returning from the chamber during an off portion of the duty cycle, the returning voltages resulting from an electro-chemical reaction in the chamber without surface reaction on the cylindrical member, and return the processed voltage to the chamber, wherein the chamber releases hydrogen gas.

According to another exemplary embodiment, a hydrogen extraction method comprises: providing conductive feedstock to a hollow chamber formed by a cylindrical wall wherein the chamber includes a cylindrical member disposed within the chamber parallel to the wall; connecting a positive terminal of a power supply via a positive reactive circuit to the chamber wall to form an anode; connecting a negative terminal of the power supply via a negative reactive circuit to the cylindrical member to form a cathode; connecting the reactive circuits to an off-cycle chamber return load circuit; applying an input pulse DC voltage to the anode and the cathode during an on portion of a duty cycle; and extracting hydrogen gas from the conductive feedstock wherein the reactive circuits and the off-cycle chamber return load circuit: process voltages returning from the chamber during an off portion of the duty cycle, the returning voltages resulting from an electro-chemical reaction in the chamber without surface reaction on the cylindrical member, and return the processed voltage to the chamber.

According to exemplary embodiments, a timed direct current (DC) in the form of a pulse from a power supply is applied in order to initiate an electronically reactive (i.e., a reference to the science of reactive electronics) electro-chemical state-change in a saltwater liquid that has inherent capacitive and impedance characteristics and values. By supplying the timed pulse with overpotential (i.e., an electrical potential that overcomes the device's natural electrical potential, where the natural electrical potential is caused by dissimilar materials in the presence of saltwater), the energy potential resident in the liquid is increased, chemical reactions in the liquid are catalyzed, and reactance characteristics within the device are triggered (the term "device" may also be referred to as a "cell" and comprises the arrangements, or a subset of the arrangements described herein). These reactive characteristics generated by the device are used to modify and sustain the input signal during the off phase of the duty cycle. These modifications generate and embed frequencies at the end of the pulsed input signal. Each cycle, on and off with wave frequency modification, generates molecular hydrogen outgas as a result of one or more of the chemical reactions. The hydrogen gas is removed from the system.

Further, according to one aspect, upon removal of the overpotential supply, there is an electrical discharge from the liquid through electrodes of dissimilar materials as the liquid attempts to return to its original electrochemical state. However, the extraction of molecular hydrogen and the presence of sacrificial materials prevent a full reversal of the process during discharge. The electrical discharge is prolonged by sets of different reversing chemical reactions.

According to one aspect, the free electrons discharged by the liquid and device are specifically directed to and captured by electrolytic capacitors that are polarized to match the device and to provide a sink for those electrons. There is no ground potential in the system. The charged capacitors supply energy that produce modified waveforms with an inherent set of frequencies governed by the reactive values within the device. During the time comprising the off-cycle (i.e. off phase of the duty cycle), unspent energy is available to assist the next application of overpotential and to complete a duty cycle.

The aforementioned arrangements and methods can provide certain benefits and advantages relative to conventional arrangements and methods. For example, according to exemplary embodiments, the methods and arrangements described above, and in further detail herein, are useful in producing hydrogen by applying an electrical current to flow through an aqueous solution between the anode and cathode. Further, cavitation and/or pulsed dielectric polarization may be generated within the aqueous solution, whereby the action lowers the amounts of energy required to break chemical bonds of the aqueous solution.

DETAILED DESCRIPTION

Figure 1:
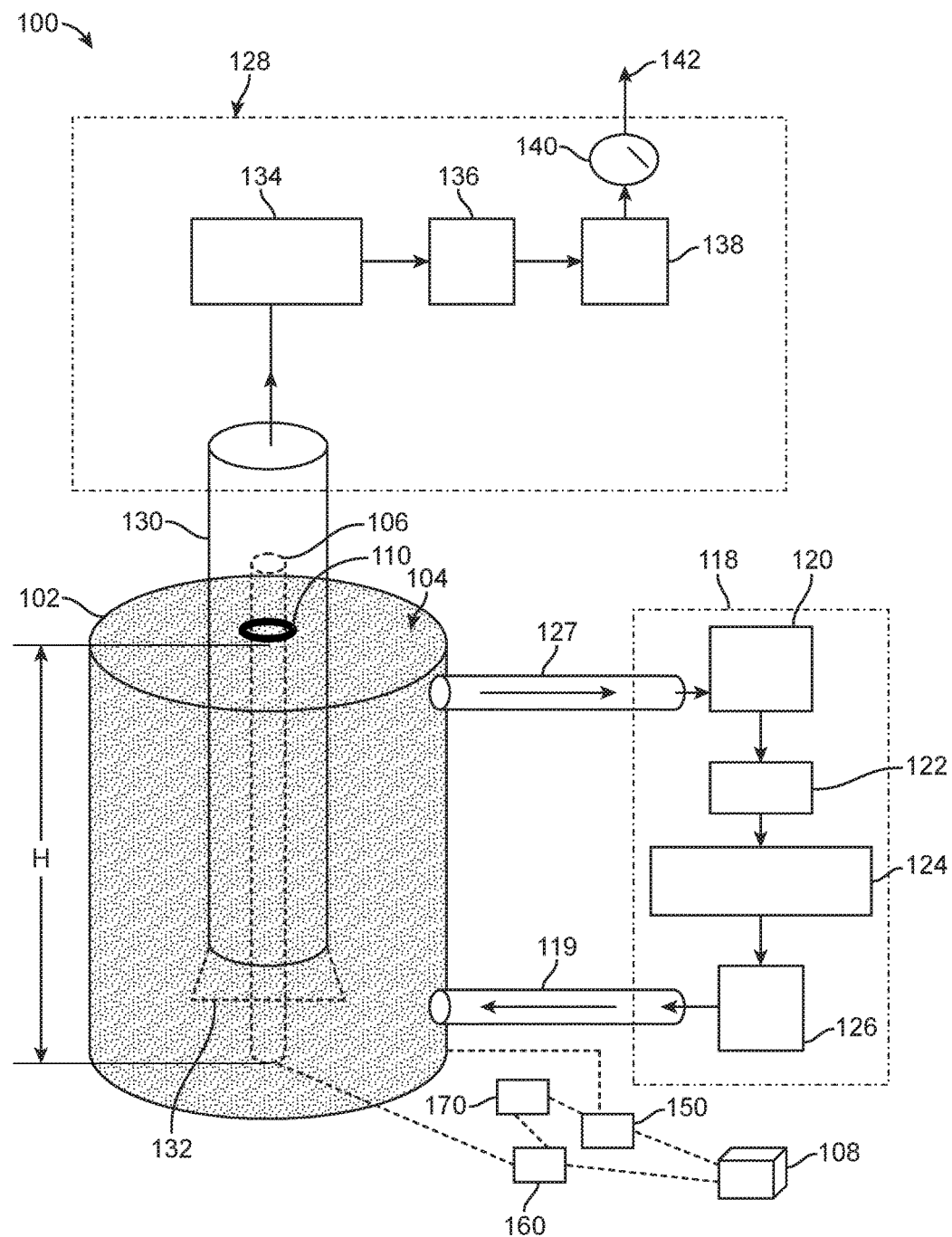
FIG. 1 illustrates a system in accordance with exemplary embodiments.

It should be understood that these embodiments are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in the plural and vice versa with no loss of generality. The disclosed methods are intended to encompass methods practiced in the same order as disclosed, as well is methods performing the disclosed steps in any order, unless otherwise indicated in the claims.

As used herein, the singular forms "a" "an" and "the" are intended to include the plural forms as well, unless the context clearly indicates otherwise. Additionally, the use of "or" is intended to include "and/or" unless the context clearly indicates otherwise.

"Pulsed dielectric polarization," as used herein refers to the use of varying electric potentials between the anode and cathode to create localized polarization of the fuel or feedstock components near the surface of the cathode.

"Electrolysis," as used herein, refers to Applicants' general protocol for producing hydrogen and carbon dioxide, but use of the term is not an admission that the process is equivalent to the conventionally understood term. Applicants have demonstrated herein that, for example, hydrogen and carbon dioxide are produced by a modified electrochemical process that departs meaningfully from pure electrolysis. However, the term "electrolysis" is sometimes used to refer in shorthand to the modified electrochemical hydrogen production process described herein.

As described further herein, at least one embodiment is a cell design comprising a coaxial outer electrode cylinder with a given inner diameter and solid rod center electrode with a given outer diameter. A radial ratio of 25:1 is maintained determining electrode separation distance within the cylinder. Materials used in the cell chamber design and in the conductive fluid (i.e., feedstock) composition play critical, interdependent roles in the electrochemical process (including sacrificial material processes). Alterations of the cell materials and chemical fluid mix change the type and intensity of reactions, and in turn determine outgases produced, production flow rates of the outgases, and relative composition ratios of the outgases. Combinations of materials and fluids are therefore selected based on desired chemistry, outputs, and intensity of electrochemical reactivity.

For example, it has been shown that the use of a graphite anode, a tungsten cathode, and saltwater fluid yield primarily hydrogen gas. The bulk of the oxygen remains molecularly retained in the device either by means of alternative fluidic reactions or by means of an oxidation reaction within the chamber wall. A small amount of carbon dioxide gas is also produced.

Regarding the input signals and circuitry, in at least one embodiment, the circuit design, capacitive cell chamber design, and chamber fluid (i.e., feedstock) are integral parts of an electrochemical circuit design. The cell chamber design is based on the 25:1 ratio, described herein. Once loaded with the chamber fluid, the cell chamber will have a desired capacitive value in the range of 47 to 4,700 microfarads with a balance impedance circuit in the range of 1 to 1,000 microhenries. Electronic components are used in the input circuit to adjust these values during operation. Electronic component polarity is critical to the overall operation in that component polarity placement governs the direction of electron flow during the on and off phases of the input pulse cycle, respectively, in relationship to chemically generated energy return of the chamber. The cell chamber and fluid are not treated as an end-load to the electronic input signal, but rather as complementary, electronically reactive components, wherein functional reactance and total circuit design function is triggered by the input pulse. The cell chamber stores and then generates energy in engineered waveforms during its off-cycle discharge or flux phase. The energy released during this flux phase, changes the chemistry in the capacitive cell producing gas bubbles within the fluid. An example of one such gas produced is molecular hydrogen.

According to an exemplary embodiment, the cylindrical electrode setup and input signals and circuitry described above functions as follows: first, an intermittent pulsed DC input signal of a given power level, time sequence, and amplitude, is supplied to a custom-designed electronic power-balancing and pre-conditioning circuit. The pulsed signal is then fed into the cell interior and into the fluid. The pulsed DC input signal has a base frequency range of 1 to 10 kHz. This base frequency is set to an optimum frequency during operation within the range given based on the required off-timing increment of the sequence for a desired chemical reaction. The pre-conditioning circuit governs and balances (i) the input amplitude with (ii) the cell chamber's reactive power amplitude, and then returns excess energy produced by the cell during the end period of the off phase of the duty cycle to the chamber.

Electronic balancing of the input signal with the returned chamber energy response facilitates a unique set of frequencies and wave shapes governed by the chamber's electrochemical characteristics. These characteristics include the chamber's unique chemical-dependent discharge pattern. The chamber's chemical and reactive energies discharge resembles a straight line DC amplitude without time sequence or frequency. The set of frequencies embedded within the chamber's reactive energy is unique and falls within three distinctive ranges: (i) a low set of frequencies starting at 650 kHz to 950 kHz; (ii) a mid-range set of frequencies stating at 1 to 5 mHz; and (iii) a high frequency range starting at 11 to 17 mHz.

The unique set of frequencies are imposed on the input pulse wave within a nanosecond of the beginning of the off portion (or off phase) of the duty cycle. The signals corresponding to the unique set of frequencies are captured in the electronic balancing circuit, amplified and fed back into the cell interior (i.e. chamber). As such, they are introduced into the fluid which assists in extending the time increment of the input cycle during the off period while activating the desired chemical reactions achieving the type of outgas release desired. These frequencies carry a distinctive wave shape that has a positive polarity in relationship to the input pulse zero reference. The energy in the form of frequency and wave shape continues for multiple microseconds after the input pulse is in the off sequence. These wave shapes and frequencies are related to the capacitive and impedance rated value of the balancing circuit that are related to the chamber discharge sequence or flux phase.

The chamber fluid is a solution of water, salts and other trace chemicals. The solution design and the cell design require a complementary input signal of a particular timing, frequency as described above. Seawater with minimum filtration to remove particulate matter or deionized water treated with a chemical base in order to resemble seawater may be used for example. This signal is used to set up the initial conditions within the reactive chamber. During the input signal's off sequence, the chamber energy reacts with the custom electronic balancing circuit to complete the desired reaction. Energy supplied by the chamber chemical reaction also provides for greater electronic efficiency in the generation of the desired output gases such as molecular hydrogen.

Certain illustrative, non-limiting aspects according to exemplary embodiments are schematically depicted in FIG. 1. As illustrated in FIG. 1, an arrangement 100 forms a hydrogen and carbon dioxide production arrangement or system. The arrangement 100 includes a first member 102. According to one illustrative embodiment, the first member 102 is defined by walls formed from any suitable material. The hollow cylindrical member 102 may act as a container for a fluid material 104.

Any suitable fluid material 104 may be used such as an aqueous-based feedstock comprising seawater. According to further optional embodiments, the feedstock may have compositions as described in U.S. patent application Ser. No. 13/170,132, the entire contents of which is incorporated herein by reference.

The arrangement 100 may further include a second member 106 disposed within the first member 102. According to one illustrative embodiment, the second member 106 is in the form of a solid cylindrical member formed from any suitable material. According to further optional aspects, the second member 106 is disposed concentrically or coaxially with respect to the first member 102.

According to exemplary embodiments, when the first member 102 and the second member 106 are formed as cylindrical members, with the second member 106 disposed within the first member 102, the members can be provided with any suitable size or dimensions. The first and second members may be provided with radii such that the ratio of the radius of the second member relative to the first member is approximately 1:25.

The arrangement 100 may further include a power supply 108 in electrical communication with both the first member 102 and the second member 106, as indicated by the broken lines appearing in FIG. 1. Any suitable means of electrical connection can be utilized for this purpose. When connected with a power source, as illustrated in FIG. 1 both the first member 102 and the second member 106 can be formed entirely from an electrically conductive material. Alternatively, at least the inner surface of the first member 102 exposed to the feedstock 104 is formed from an electrically conductive material, and at least the outer surface of the second member 106 exposed to the feedstock 104 is formed from an electrically conductive material. The remaining portions of the first and second members 102 and 106 respectively can optionally be formed from a non-conductive material.

According to certain embodiments, the power supply 108 is configured so as to electrically connect at least the conductive portion (such as the inner surface for example) of the first member 102 to a positive terminal thereof, and to electrically connect at least the outer surface of the second member 106 to the negative terminal thereof. Thus, the first member 102 forms an anode, and the second member 106 forms a cathode. As a result, an electrical potential is created between the inner surface of the cathode 106 and the outer surface of the anode 102.

The wall of chamber 102 may be composed of graphite and is positively charged. The wall may have a height of approximately 50 mm. The chamber may have a diameter of approximately 25 mm (i.e. radius of 12.5 mm). The second member 106 may be composed of tungsten and is negatively charged. In such case, the tungsten rod may have a diameter of approximately 1 mm and a height or length of approximately 50 mm. A conductive fluid (such as water with sodium chloride and other trace chemicals) may be supplied to the chamber void (i.e. between the rod and the chamber wall). This fluid may form a conductive path from the outer chamber wall to the inner chamber rod. The fluid and chamber combination form a non-ideal capacitor with capacitive and inductive values.

The positive terminal of power supply 108 is connected via positive reactive circuit 150 to chamber 102. The negative terminal of power supply 108 is connected via negative reactive circuit 160 to the second member 106. Both reactive circuits 140 and 150 may also be connected to an off cycle chamber return load circuit 170. The reactive circuits and the off cycle chamber return load circuits are described further below with reference to FIG. 3. The power supply connection to chamber 102 provides electron flow to chamber 102. The chemical energy within the chamber interior provides a reverse polarity electron flow. This reverse polarity electron flow may also be referred to as an inductive electromotive force (EMF). At the time of electron flow, a magnetic field in a predictable order is generated. Prior to electron flow sequence, the polarities of the molecules in the chamber are in a chaotic order. Each molecule within the fluid has an individual polarity orientation at the start of the sequence. Once energy is supplied to the chamber and electron flow is initiated, molecular orientation changes in response to a new magnetic field polarity within the chamber. The pulsed energy causes the magnetic field to rise and collapse with each on-and-off sequence of the timing circuit. The rise and collapse of the magnetic field also causes molecular rotation.

Molecular rotation, during the rise and collapse of the magnetic field order within the chamber, generates additional forces in the form of vector and velocity values. These rotations cause respective nano-scale distances to increase and decrease between atoms. Rotational effects during the on and off portions of the impulse cycle reduce the strength of the atomic bonds to aid in the separation of the atoms making up each molecule's composition. Collisions between molecules caused by the rotation cycles also cause chemical reactions.

Magnetic field flux is caused both during the on phase (or on portion) of the pulse duty cycle as the electrical and corresponding magnetic fields form and again during the opposite effects of the off phase of the duty cycle. As the magnetic filed forms during the on phase of the duty cycle, molecules in fluid 104 with dipolar moments (such as water) align to the field. The molecular orientations of fluid 104 in the chamber adjust further as the fluid molecules are pushed through magnetic lines of force y thee forced recirculation of fluid 104 through the chamber of member 102.

During the off phase of the pulse duty cycle, the electrical field changes to re the lagging reactive electrical current dynamics inside the chamber and the magnetic field changes accordingly. In general, molecular alignments within fluid 104 will revert back to their mean state of increasingly random molecular orientation or polarity until the next on phase of the duty cycle.

Furthermore, during the off phase of the duty cycle, the electrical discharge effects of the chamber are slowed using an electronic flow control circuit. The effect of the flow control circuit is no regulate the deterioration of the electrical and magnetic fields, reducing and prolonging the magnetic flux, and thereby regulating the molecular rotation of vector velocity of the dipolar fluid molecules in the chamber.

A change in magnetic field has its own second-order effect. When an EMF is induced by magnetic flux, the polarity or current direction of the induced EMF produces an opposing current magnetic field flux component. The induced magnetic field inside a loop of wire acts to keep the magnetic flux in the loop constant.

The net magnetic field of the chamber is very complex. The chamber magnetic field is designed to have a strong influence on molecular structure of the conductive fluid within the chamber, assisting in the molecular separation and energy harvesting within the chamber. The conductive fluid within the chamber is in constant movement due to the use of an active recirculation system. The input pulse to the chamber initiates a magnetic field, aligned in relation to the flow of input electrons into the chamber. Initial magnetic field lines are cut by the conductive fluid in motion. The motion of the fluid through the chamber increases the magnetic field strength within the chamber. Specifically, the motion of the fluid within the influence of the initial input induced magnetic field (input-cycle) yields additional measureable energy. The additional energy is returned from the chamber via the return leg of the electronic circuit, The energy returned via the return leg of the circuit has frequency values. The energy frequencies are carried in waves shaped dynamically by the chamber. These waves are captured in the return electronic loop and then re-applied to the chamber in a reverse polarity discharge-feedback-cycle to regulate a desired molecular reset-cycle of the conductive fluid and to assist with molecular separation within the conductive fluid. This process enables molecular separation to occur at lower energy states within the chamber.

During the off phase of the duty cycle, electricity still flows due to the aforementioned induced energy return (i.e. reactance) of the chamber. The chamber's unique signature return loop and net reactance modifies the off-cycle molecular polarity reset-cycle sequence. Excess return loop energy that is not attenuated during the off-cycle is added to the next on phase of the duty cycle. Such addition modifies (i.e. constructively interferes with) the next on phase of the duty cycle.

The chamber 102 and member 106 (rod) arrangement of FIG. 1 forms a unique shape that allows for uniform and non-uniform lines of magnetic force formation. These magnetic fields follow Faraday's law of electromagnetic induction with the exception of the molecular magnetic fields influence. The molecular magnetic fields are influenced during the on state of the input cycle causing a polarity shift at the molecular level. These molecular magnetic fields form a counter electromotive force (EMF) which may be measured at the electrodes in the form of a voltage differential. These voltage differentials are at least 0.9 VDC before initial energy is applied and at least 3.4 VDC after energy has been applied. Lenz's law of opposite or opposing magnetic field polarity will apply to this state of the chamber operation.

These magnetic fields form a 360° process area around the center cathode material just off the surface where gas formation takes place. These magnetic fields form a similar area just off the surface of the anode material although no gas formation is visually observable in this area of the chamber. Therefore, no surface reaction takes place either along (i) the surface of the chamber walls (anode) or along (ii) the surface the rod in the center (cathode). This has been validated by a lack of deterioration of the cathode and the anode. Furthermore, in simulations where the center electrode projected below the chamber and was not subjected to the insulation (such as insulation 110 at the top of chamber 102), deterioration of the center electrode was evident.

Figure 3:
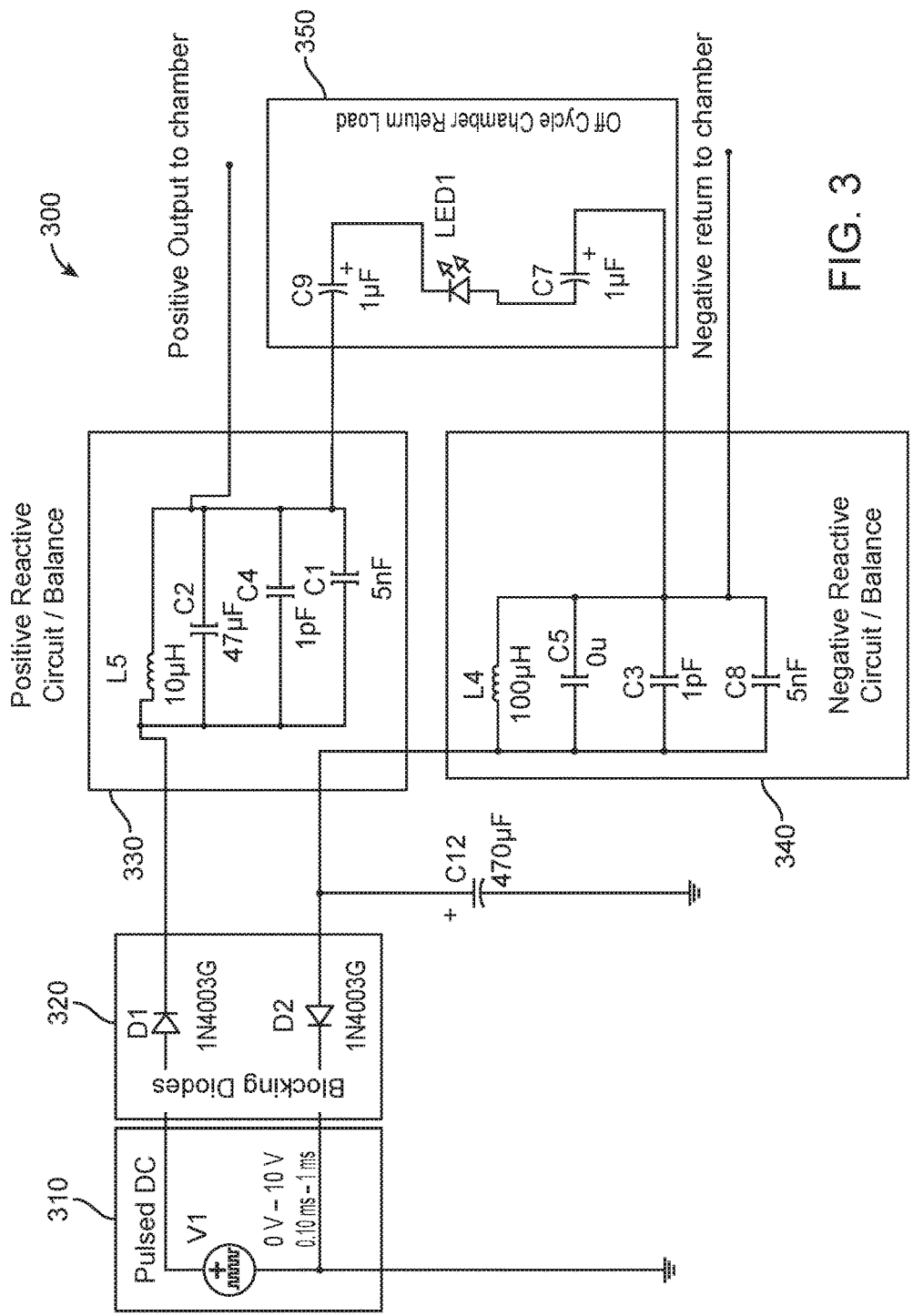
FIG. 3 illustrates a balancing circuit in accordance with exemplary embodiments.

The chamber design when filled with conductive fluids form a very reactive electronic circuit. As described above, a variety of forces are interacting with each other. These include electrochemical and magneto-hydrodynamic forces. A chamber control circuit (comprising positive and negative reactive circuits 150 and 160 of FIG. 1) is used for impedance matching and capacitive balancing. Balancing the control circuit accomplishes multiple functions. These functions include, but are not limited to: electronic circuit efficiencies, lowering reactive circuit current demand and proper frequency management. The control circuit is designed to direct a pulsed DC input signal at a given base pulse frequency to the reaction chamber. The circuit design, as illustrated in FIG. 3 includes a plurality of sections. The circuit assists the reaction chamber in very high efficiency levels of gas production while limiting input voltage amplitude and current.

In circuit 300 of FIG. 3, the pulsed DC section 310 may correspond to power supply 108 of FIG. 1 and supplies a direct pulse at the input stage of the circuit. The pulse may have amplitude ranging from 0 VPDC to 50 VPDC. Variation on the input amplitude may be based on desired chamber performance. The pulsed DC section provides for adjustments in the pulse width or duty cycle based on a desired chamber performance in gas type and generation quantity. The pulse width may be set for a desired length in the on and off cycle timing. A combined on and off cycle form one full cycle. The timing of the duty cycle establishes a base frequency for the pulsed dc signal. This pulse base frequency can range from 100 Hz to 10 kHz for example. The timing of the input pulse is adjusted in such a manner as to maintain an optimized rise time while maintaining the least amount of time sweep during the rise time. The duty cycle can vary from 10-13% (in the on cycle versus the off cycle time) for example. The duty cycle or timing is set for desired chamber efficiencies versus gas type and generation quantity.

The blocking diode section 320 prevents voltages returned from the chamber from interfering with the input signal. The diodes within 320 isolate the downstream circuit during the off cycle while the reactive part of the circuit is in recovery. The isolation from the input assists with collecting and manipulating the energy being returned from the reaction chamber. The reaction chamber has frequency values embedded in the DC return voltage. The return voltage may have an amplitude ranging from 0.9 VDC to 4.2 VDC while the input voltage average amplitude based on the pulse width may range from 0.7 VPDC to 1.4 VPDC.

The positive reactive balance section 330 sets and balances impedance and capacitance within the reaction chamber. The reaction chamber has varying internal restive (ohmic) and voltage amplitude values. The variation may be based on electrolyte conditions that the input pulse has to overcome. The capacitance assists in storage of energy that is released at the appropriate time to assist in the over potential that is required to drive the reaction cycle within the chamber. The impedance balances the circuit while providing lower amplitude and steady state current draw during the on cycle. This portion of the circuit also provides to imbalance the return circuit. The positive input to the reaction chamber is connected to this section of the circuit.

The negative reactive balance section 340 sets and balances impedance and capacitance within the reaction chamber on the negative return. The chamber does not have the same zero value at ground as the input pulse section. The chamber is not grounded in the conventional sense of circuit design. The chamber, through the circuit design, establishes a zero reference point unique to the reaction chamber. This zero reference point is used during the reset/return operation of the reaction chamber during the off cycle. The internal resistive (ohmic) and voltage amplitude that the input pulse has to overcome is assisted with the section similar to the positive reaction circuit. The values for impedance and capacitance are different from those on the positive side. The capacitance assists with storage of energy that is released at the appropriate time to assist in the over potential required to drive the reaction cycle of the chamber. The impedance balances the circuit while providing lower amplitude and steady state current draw during the on cycle. This section of the circuit also imbalances the return circuit. The negative input to the reaction chamber is connected to this section of the circuit.

The off cycle chamber return load section 350 is in reverse polarity to the pulsed dc input. This section of the circuit consists of a light emitting diode (directional load) in reverse polarity that completes the circuit through a set of reversed polarity electrolytic capacitors. They act as a secondary load to the chamber's reset reaction during the off cycle and thus restricting the electron discharge flow rate. The energy stored in the positive and negative capacitor banks is then allowed to interact with the chamber reset energy. This interaction assists in establishing a set of frequencies that are generated by the molecular reset function within the chamber. These frequencies are established on demand during the off cycle. At this point all input energy is in off position of the cycle. All energy that is in use at this time is either from stored energy potential in capacitor banks or from the energy created in the chamber pushing back into the circuit. Oscilloscope monitoring during the off cycle of the input pulse verifies the interaction from the chamber and system control circuit. The blocking diode section 320 prevents any flow of electrons from reaching the pulsed DC section 310. This limits interference with the pulsed dc input signal when the next on cycle is initiated.

Alternatively, the cathode can be formed 106 from base material, such as graphite, provided with a sheath or layer of platinum thereon. According to a further option, the cathode 106 can be formed from tungsten carbide, or a similar tungsten alloy.

According to exemplary embodiments, the length of the cathode exposed to the feedstock 104 is approximately equal to the height H of the anode. As illustrated in FIG. 1, the actual length of the cathode 106 may extend above the height of the anode 102. In such a case, the portion of the cathode 106 that extends above the height of the anode 102 can be electrically insulated from a portion in communication with the feedstock. This can be accomplished by any suitable technique, such as by disposing a collar of insulating material 110 around the cathode 106, as also illustrated in FIG. 1.

According to exemplary embodiments, the power supply 108 used to power at least the anode 102 and cathode 106 is configured and arranged to provide a direct current (DC) supply of power. According to one optional variation of the arrangement 100, a DC power supply, having a plurality of channels, is used to power the anode 102 and a cathode 106.

The efficiency of an anode/cathode-based system can be markedly improved through manipulation of the power signals applied thereto. For example, according to exemplary embodiments, a power supply may be configured and arranged so as to produce electrical signals to the anode and cathode (e.g., 102, 106). Power supply 108 produces electrical signals to the anode and cathode.

Figure 5:
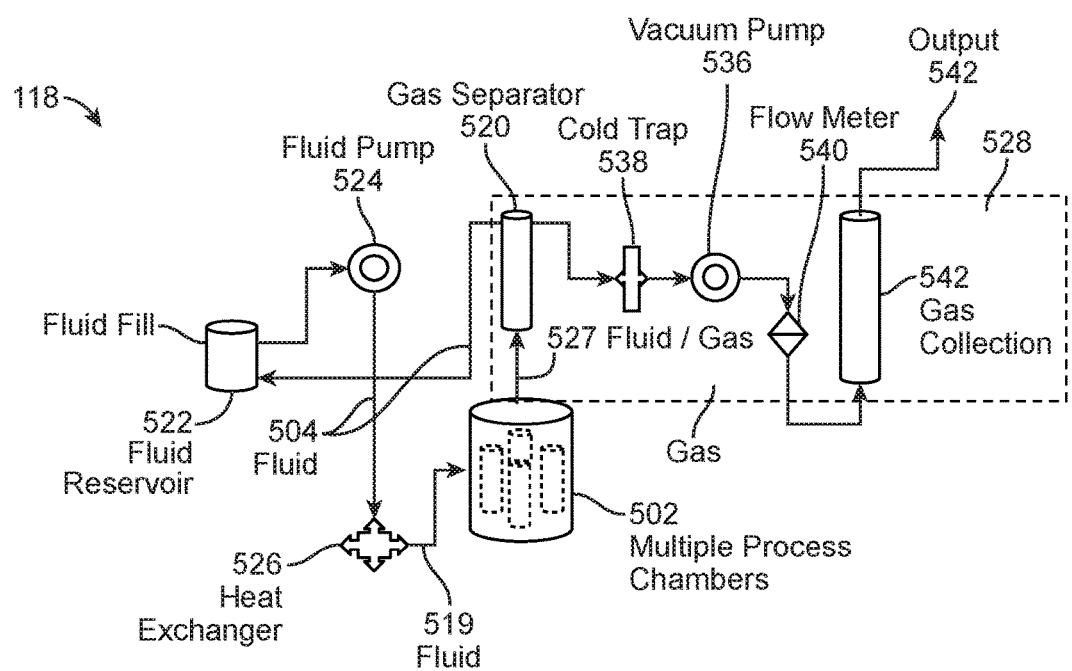
FIG. 5 illustrates a recirculation system of FIG. 1.

The arrangement 100 may be optionally provided with a feedstock recirculation system 118. The recirculation system 118 is schematically illustrated in FIG. 1 (and in FIG. 5) and it may have any suitable configuration evident to those skilled in the art based on the teachings provided herein. According to one illustrative example, the feedstock 104 passes through a first conduit 127 through a gas contractor 120, and into a fuel reservoir 122. The feedstock is pulled through a pump 124 and passed into a heat exchanger 126, then returned into the container formed by the first member 102 via a second conduit 119. The reservoir 122 serves as a preconditioning zone to maintain feedstock and catalyst concentrations at the desired levels, and may also provide a sensing point within the circulation system. The heat exchanger maintains a constant temperature. The closed nature of the system allows the selection and maintenance of a particular selected operation pressure or range of pressures.

The arrangement 100 may further comprise a gas collection arrangement or system 128, as illustrated in FIG. 1, may have any suitable configuration evident to those skilled in the art based on the teachings provided herein. According to further illustrative and non-limiting examples, gas is pulled through conduit 127 and from the gas contactor 120 through a cold trap 138 by vacuum pump 136, which then pushes the gas through a flow meter 140. According to further optional aspects, the gas may be collected and utilized outside of the illustrated system or arrangement 100 as indicated at element 142.

Arrangements constructed according to exemplary embodiments may further include a plurality of sensors (not illustrated) to monitor and control various aspects of the arrangement are system. Such sensors may include one or a combination of sensors to monitor the electromagnetic environment of the arrangement, the temperature of the system, the pressure of the system, the temperature of the heat exchanger, the acoustic environment within the system, and the concentration of the feedstock and/or one or more of its constituent components. The acoustic and electromagnetic sensors can provide signals for maintaining optimized hydrogen output. Other environmental sensors provide the ability to maintain optimal operating conditions. Sensors monitoring the output of separated gas can facilitate, inter alia, monitoring of the efficiency of the gas separation process.

When used as a system to extract hydrogen and carbon dioxide from an aqueous feedstock, power supply 108 causes cathode 106 to be negatively charged and anode 102 to be positively charged. As a result, an electrical potential difference is created between cathode 106 and anode 102. The electrical potential difference polarizes the ions close to the cathode. An amount of current is also created as the electrochemical reaction proceeds. These actions on the feedstock 104 cause formation of hydrogen and carbon dioxide. The gas extraction system removes the gases out of container 102 for further use (shown by arrow 142), such as to provide fuel for hydrogen fuel cells, to directly power an engine of a transportation vehicle, or provide components for further chemical processes like a Fischer-Tropsch reaction system. As feedstock 104 is consumed and the constituent gases are removed from the system 100, additional feedstock can be added through an inlet (e.g., 119).

Figure 2:
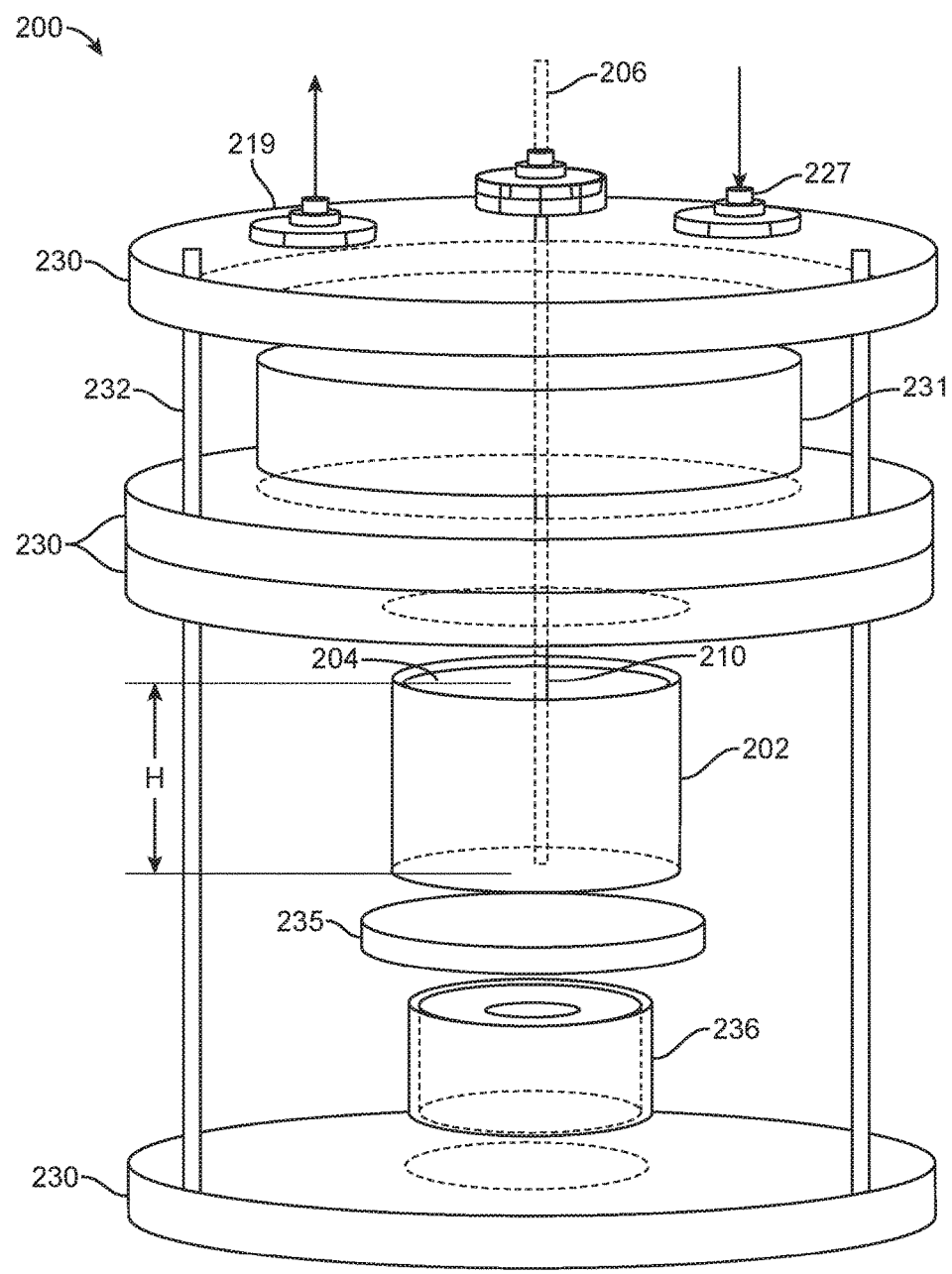
FIG. 2 illustrates aspects according to exemplary embodiments.

Exemplary embodiments, as illustrated in FIG. 2 may include a stabilization platform having four rigid, nonconductive base plates 230, a rigid, nonconductive tube 231, a rigid, nonconductive plate 235, a nonconductive, rigid tube 236, and a series of six stainless steel bolts 232 and accompanying nuts, washers and spacers provide a framework for a liquid-tight support structure. Two base plates 230 and the tube 231 form a fuel reservoir. The plate 235 forms a base. The polycarbonate tube 236 provides support between the base plate 230 and the plate 235. Other elements shown in FIG. 2 have corresponding features as 100-series elements in FIG. 1 such as, for example, cathode 106/206.

Figure 4:
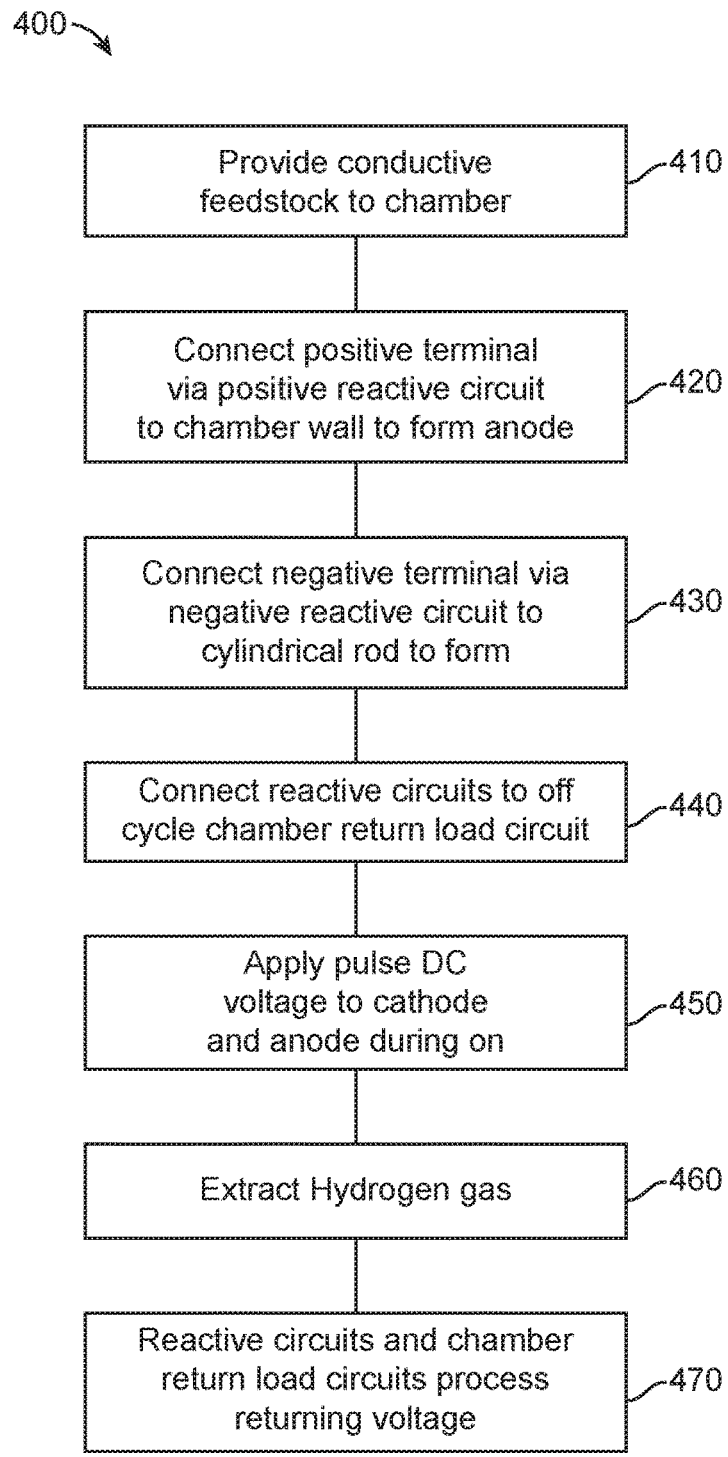
FIG. 4 illustrates a method in accordance with exemplary embodiments.

A method in accordance with exemplary embodiments is illustrated in FIG. 4. A conductive feedstock is provided to the chamber at 410. The positive terminal of the power supply is connected to the chamber wall via a positive reactive circuit at 420. The negative terminal of the power supply is connected to the cylindrical member via a negative reactive circuit at 430. The reactive circuits are connected to the off cycle chamber return load circuit at 440. An input pulse DC voltage is applied to the anode and the cathode during an on portion of a duty cycle at 450. Hydrogen gas is extracted from the conductive feedstock at 460. The reactive circuits and the off cycle chamber return load circuit process voltages returning from the chamber during the off portion of the duty cycle and return the processed voltage to the chamber at 470. The processing may include: balancing impedance and capacitance within the chamber, preventing the returning waves from interfering with signals being input to the chamber and returning the processed voltages to the chamber.

Figure 6:
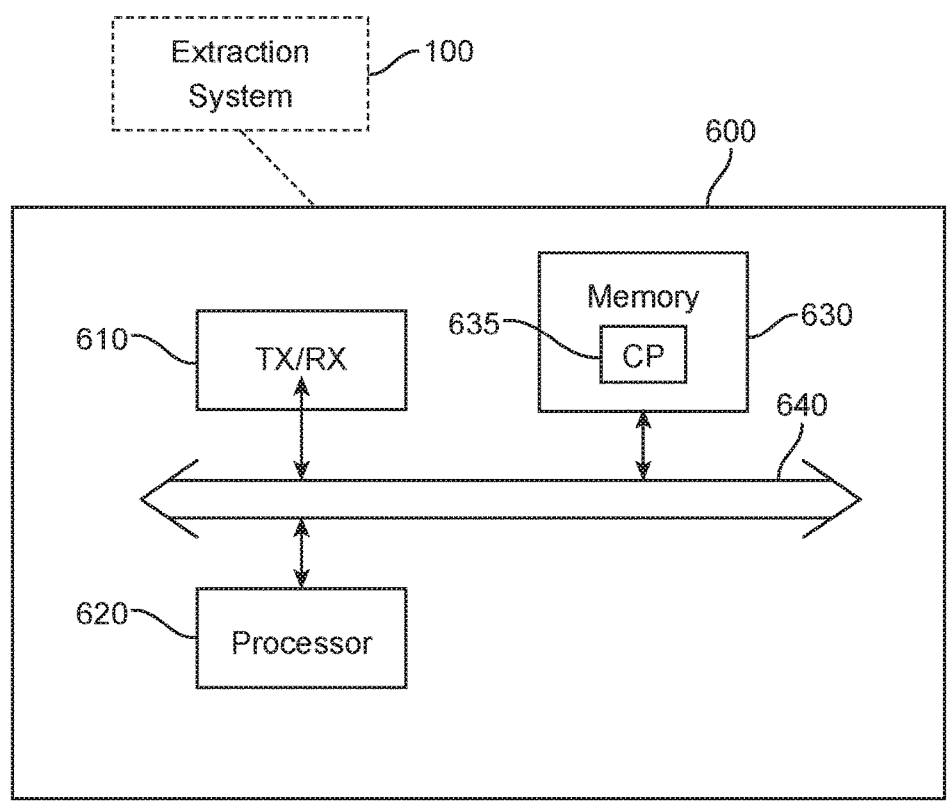
FIG. 6 illustrates a computing device in accordance with exemplary embodiments for operating the system of FIG. 1.

Exemplary embodiments such as the process or method steps described above with reference to FIG. 4 may be implemented within a computer program that can be executed on a general purpose computer. An exemplary computer 600 such as that illustrated in FIG. 6 includes a transceiver 610, a processor 620 and a computer readable medium 630. Transceiver 610, processor 620 and memory 630 may be interconnected via a bus 640. The computer program may be stored in memory 630. Computer 600 may be connected to the exemplary system 100 of FIG. 1 to perform the steps of FIG. 4.

In one embodiment, in order for processor 620 to perform the steps illustrated in FIG. 4, memory 630 may comprise a computer program (CP) 635 with computer program modules which when run by the processor 620 causes the user equipment 600 to perform all or some of the steps illustrated in FIG. 4. A plurality of sensors (that monitor various aspects of system 100) may provide data to the computer 600.

The production rates of hydrogen gas are dependent on the type of input supplied to the reaction chamber(s) and the type conductive fluid in the chambers. The reaction chamber (s) as described produce gas throughout a set spectrum of settings. These settings such as pulsed DC width duty cycle, amplitude of pulse and pulse base frequency are adjusted for desired levels of gas production versus desired efficiencies.

An efficiency in the levels of gas production is desirable. Efficiency measurements are determined by comparing the amount of input energy used with the amount of energy released in the form of Hydrogen gas. Based on a given atmospheric pressure and temperature, a value may obtained. Example obtained At standard atmospheric pressure and temperature at sea level, approximately 6.06 milliliters of hydrogen gas equals to one (1) watt of energy.

An efficiency greater than 1 to 1 in hydrogen production is desirable. The unique chamber design and customized electronic circuitry as described herein facilitate obtaining such efficiency. Such efficiency has been realized with an input setting of 0.73 VPDC at 0.0387 amps. These settings equal to 0.28 watt. At this wattage setting, in order to achieve a 1 to 1 production rate of hydrogen gas, a quantity of 1.71 milliliters of gas has to be produced.

In the system and methods described herein, quantities of Hydrogen gas exceeding 3.42 milliliters have been realized. This production rate exceeds the 1 to 1 rate by a factor of 2. That is, the efficiency achieved is 2 to 1 (3.42=1.71*2). In the exemplary systems, for one watt of input energy, two watts of energy in the form of hydrogen gas is achieved (a level of 200 percent).

The efficiency and hydrogen production rates can be varied through different input settings coupled to the circuitry as discussed. Efficiencies greater than 3 have been achieved. A production rate greater than 5 milliliters per cell/chamber at efficiencies greater than 2 have been achieved repeatedly.

Salt bridges are used in electrolysis to act as an electrical conductor between the two electrodes in an electrolytic fluid. When using sea water, a salt bridge can sometimes form between the two electrodes if they are relatively close to each other. This would then reduce the production area and eventually form a short circuit between the electrodes. By constantly recirculating saltwater as described above, as well as the greater distance between the electrodes, such salt bridge formation has been avoided.

The large difference in the surface areas of the electrode materials causes a concentration or electron buildup at the cathode. This may result from the large area of the anode having electrons leaving and moving towards the small cathode. The area around the cathode would have to become very saturated as the negative charged electrons try to find a pathway to the cathode to leave the chamber.

Electrons are being emitted from a full 360 degrees of the chamber walls along the length of the 50 mm chamber height that form the positively charged anode. As the electrons flow toward the center (i.e. the negatively charged cathode), they are forced into a continuing decreasing area. This forms an area of electron saturation just off the surface of the cathode. Electrons have the same negative charge. The electrons try to repel each other and may contribute to the lack of surface reaction along the tungsten rod.

Methods and techniques associated with the above described operation and functionality may include one or more of: forming an arrangement comprising combinations of any of the above-described features; transmitting electrical signals to certain members of the arrangement in any of the ways described previously herein; generating a product (e.g., hydrogen); and capturing and handling the product, in any of the ways previously described herein.

Other embodiments within the scope of the claims herein will be apparent to one skilled in the art from consideration of the specification or practice of exemplary embodiments as disclosed herein. It is intended that the specification be considered exemplary only, with the scope and spirit of the disclosure being indicated by the claims.

In view of the above, it will be seen that the several advantages of the invention are achieved and other advantages attained. As various changes could be made in the above methods and compositions without departing from the scope of the invention, it is intended that all matter contained in the above description shall be interpreted as illustrative and not in a limiting sense.

Any numbers expressing quantities of ingredients, constituents, reaction conditions, and so forth used in the specification are to be understood as being modified in all instances by the term "about." Notwithstanding that the numeric al ranges and parameters setting forth, the broad scope of the subject matter presented herein are approximations, the numerical values set forth are indicated as precisely as possible. For example, any numerical value may inherently contain certain errors or inaccuracies as evident from the standard deviation found in their respective measurement techniques. None of the features recited herein should be interpreted as invoking 35 U.S.C. §112, 6, unless the term "means" is explicitly used.

PRIORITY CLAIM

The present disclosure claims priority to Provisional Application No. 62/091,702 filed on 15 Dec. 2014, the subject matter of which is incorporated herein by reference.

We claim:

1. A system for extracting hydrogen from a conductive fluid comprising:
    a hollow chamber defined by a cylindrical wall;
    a cylindrical member disposed within the chamber parallel to the wall;
    a mechanism for providing conductive feedstock to the chamber;
    a second mechanism for re-circulating the conductive feedstock through the chamber;
    a power supply having a positive terminal connected via a positive reactive circuit to the chamber wall to form an anode and a negative terminal connected via a negative reactive circuit to the cylindrical member to form a cathode, the power supply providing an input pulse DC voltage for an on portion of a duty cycle; and
    an off cycle chamber return load circuit connected to the positive and negative reactive circuits wherein the reactive circuits and the off cycle chamber return load circuit:
        process voltages returning from the chamber during an off portion of the duty cycle, the returning voltages resulting from an electro-chemical reaction in the chamber without surface reaction on the cylindrical member, and return the processed voltage to the chamber, wherein the chamber releases hydrogen gas.

2. The system of claim 1 wherein the feedstock is seawater.

3. The system of claim 1, wherein the cylindrical member is formed from Tungsten.

4. The system of claim 1, wherein the walls are formed from Graphite.

5. The system of claim 1, wherein a ratio of a radius of the chamber to a radius of the cylindrical member is 25:1.

6. The system of claim 1, wherein a diameter of the chamber is 25 mm.

7. The system of claim 1, wherein a diameter of the cylindrical member is 1 mm.

8. The system of claim 1, wherein a height of the wall is 50 mm.

9. The system of claim 1, wherein the chamber is formed from a block Graphite, the block including a plurality of chambers with each chamber having a respective cylindrical Tungsten rod.

10. The system of claim 1, wherein only the inner surface of the anode is in communication with the feedstock.

11. The system of claim 1, further comprising a plurality of sensors for monitoring activity within the system.

12. A method for extracting hydrogen from a conductive fluid comprising:
providing conductive feedstock to a hollow chamber formed by a cylindrical wall wherein the chamber includes a cylindrical member disposed within the chamber parallel to the wall;
connecting a positive terminal of a power supply via a positive reactive circuit to the chamber wall to form an anode;
connecting a negative terminal of the power supply via a negative reactive circuit to the cylindrical member to form a cathode;
connecting the reactive circuits to an off cycle chamber return load circuit;
applying an input pulse DC voltage to the anode and the cathode during an on portion of a duty cycle; and
extracting hydrogen gas from the conductive feedstock wherein the reactive circuits and the off cycle chamber return load circuit:
process voltages returning from the chamber during an off portion of the duty cycle, the returning voltages resulting from an electro-chemical reaction in the chamber without surface reaction on the cylindrical member, and
return the processed voltage to the chamber.

13. The method of claim 12, wherein the feedstock is seawater.

14. The method of claim 12, wherein the anode and cathode are cylindrical, the cylindrical cathode being disposed symmetrically within the cylindrical anode.

15. The method of claim 12, wherein a ratio of a radius of the cathode to a radius of the anode is approximately 1:25.

16. The method of claim 12, further comprising forming the anode from graphite and forming the cathode from tungsten.

17. The method of claim 12, wherein the cylindrical anode has a cylindrical inner surface and a cylindrical outer surface, wherein only the inner cylindrical surface of the anode is in communication with the feedstock.

18. The method of claim 12, wherein the on portion of the duty cycle is less than 13% of the duty cycle.

19. The method of claim 12, further comprising re-circulating the fluid through the chamber.

* * * * *